United States Patent [19]

Yang

[11] 3,919,897
[45] Nov. 18, 1975

[54] CONTROL LINE REGULATOR SURGE LOCK ASSEMBLY

[75] Inventor: Elmer Chensheng Yang, Anaheim, Calif.

[73] Assignee: Pacific Scientific Company, Anaheim, Calif.

[22] Filed: Jan. 14, 1974

[21] Appl. No.: 433,249

[52] U.S. Cl. .......................................... 74/501.5 R
[51] Int. Cl.² .......................................... F16C 1/10
[58] Field of Search .............................. 74/501.5 R

[56] References Cited
UNITED STATES PATENTS

| | | | |
|---|---|---|---|
| 2,716,252 | 8/1955 | Mackie et al. | 74/501.5 X |
| 2,787,916 | 4/1957 | Cushman | 74/501.5 |
| 2,810,300 | 10/1957 | Picford | 74/501.5 |
| 2,835,459 | 5/1958 | Stewart | 74/501.5 UX |
| 2,856,790 | 10/1958 | Norton | 74/501.5 |
| 2,934,971 | 5/1960 | Phelan | 74/501.5 |
| 2,992,568 | 7/1961 | Benkovsky et al. | 74/501.5 |
| 3,277,738 | 10/1966 | Glauser et al. | 74/501.5 |
| 3,316,775 | 5/1967 | Wrighton et al. | 74/501.5 |

*Primary Examiner*—Samuel Scott
*Assistant Examiner*—Lance W. Chandler
*Attorney, Agent, or Firm*—Knobbe, Martens, Olson, Hubbard & Bear

[57] ABSTRACT

A surge lock for use in conjunction with control line regulators to compensate for breakage in a control cable. A crosshead assembly is slidably mounted on a lock shaft and is connected to respective ends of the control cables. Within the crosshead is located a locking device surrounding the lock shaft on which the locking device locks in response to a sudden release in the tension of one or both of the control cables. The locking device is activated by rocker arms which are pivotally mounted on the crosshead and respond to the sudden release of tension in the control cable. The movement of the rocker arm into engagement with the locking device is caused by activating springs within the crosshead.

15 Claims, 6 Drawing Figures

CONTROL LINE REGULATOR SURGE LOCK ASSEMBLY

BACKGROUND OF THE INVENTION

This invention relates generally to control cable apparatus for controlling different elements on an airplane such as a rudder, elevator or aileron. More specifically, this invention is directed to devices utilized to compensate for sudden breakage in a control line or cable to prevent or limit the adverse affects on the control system. It is well known in the art that various control line regulators generally use one or more compression or regulator springs which exert a desired tension on the control lines through the use of various linkage members or arrangements. This tension is desired in order to provide the requisite positive control to the element within the vehicle to be controlled. The compression springs provide a constant tension within the control lines to compensate for various changes in temperature and environment which affect the tensile forces within the control lines which are accentuated by longer lengths in the control line.

An important concern in the use of a control line regulator is its ability to best accommodate a possible breakage in the control cable. Since the control line regulator is connected to two control cables which provide for the movement of the controlled element in one or the other of two directions, the control line regulator is designed to provide a balanced tension between the two control cables. However, if one of the control cables should break, the regulator will pivot in the direction of the other control cable because of the unbalanced tension or spring action of the other control cable. Also the energy stored in the compression springs creates further tension in the unbroken cable causing it to pivot the regulator further in the direction of the unbroken cable. This is not desirable and can be disastrous since control is therefore further reduced, making it more difficult for the pilot to compensate for the loss of control. Hence, it is desirable to have a surge lock mechanism to prevent the energy of the regulator springs from being released in order to best maintain the ability to control the vehicle.

There are prior art surge lock mechanisms which minimize the effect of the control line regulator springs from pivoting the regulator. However, the designs of such surge lock arrangements do not operate with the efficiency and speed required to prevent some pivoting of the control regulator. This is because the control line regulator pivots to some extent before the locking device engages. In addition, many of these prior art devices are quite complicated in construction and operation, resulting in not only costing more to produce, but also adversely affecting reliability.

In some prior art devices the flexing of an airplane wing may cause enough movement in the control cable to inadvertently activate the surge lock. Additionally, such devices in many instances are quite difficult to unlock, causing problems if the surge lock has inadvertently locked. Previous surge lock designs have been susceptible to accelerated fatigue and wear caused by the constant vibration in the airplane eventually resulting in improper operation.

SUMMARY OF THE INVENTION

The invention disclosed herein utilizes a locking member which locks onto the locking shaft supporting a regulator crosshead assembly in response to breakage of either of two control cables connected to the crosshead assembly. In a preferred form of the regulator, the locking member comprises a canting washer loosely surrounding the locking shaft and pivotally mounted on the crosshead assembly. For each control cable there is a rocker arm which engages opposite sides of the locking washer to wedge it on the locking shaft in response to a spring force which is released when a cable experiences a sudden release of tension. Hence, the surge lock is activated in quick response to breakage in a control cable, so that the effect on the vehicle is minimized.

The design of the surge lock is such that vibrations in the vehicle will not cause an unwarranted activation of the surge lock. Also the vibrations in the airplane or other types of vehicles will not promote accelerated fatigue and wear. If the lock should function in response to a sudden release of tension on a cable but the cable does not break, the lock will unlock when tension is restored on the cable.

DETAILED DESCRIPTION OF THE INVENTION

Figure 1:
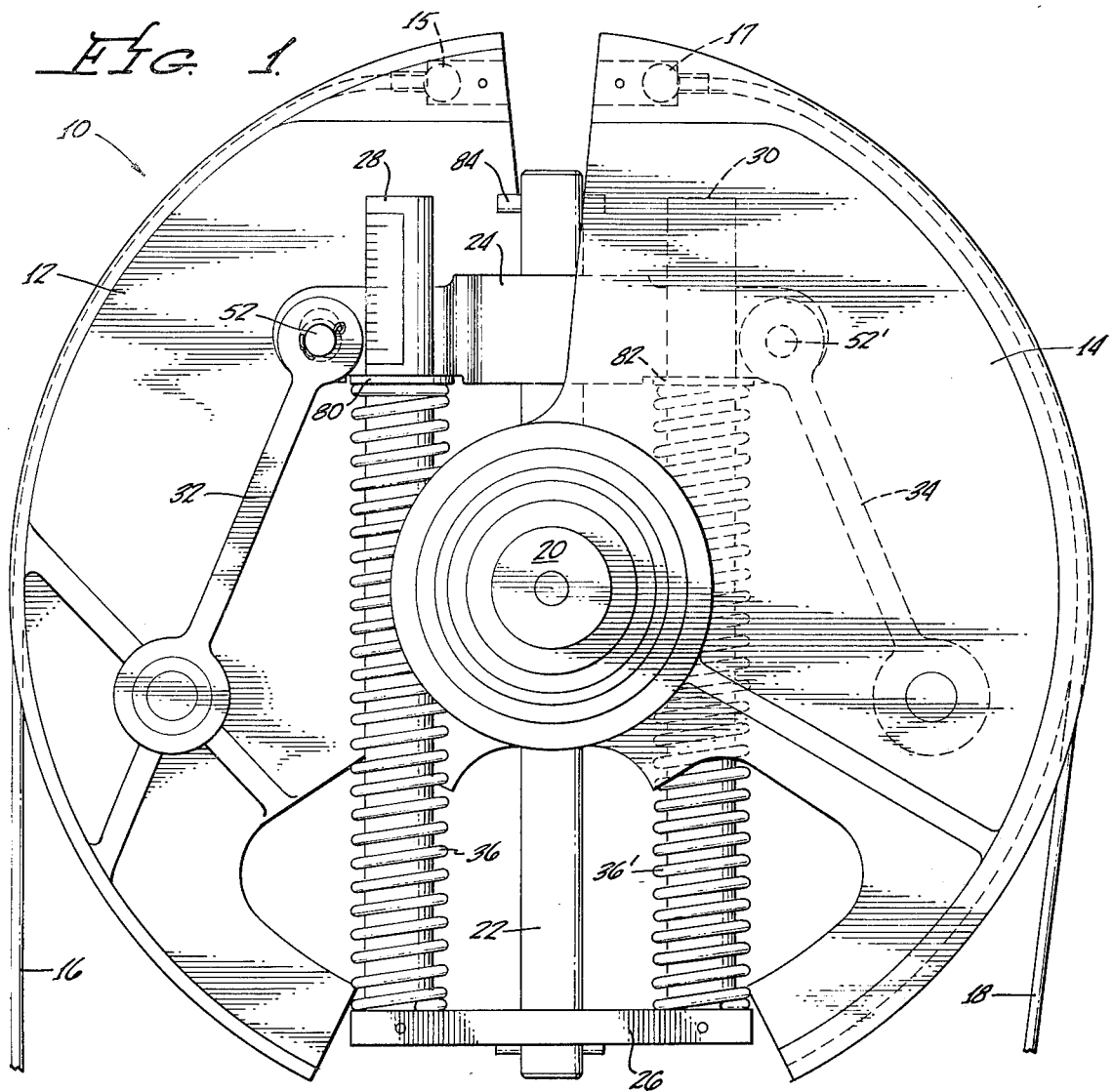
FIG. 1 is a side view of a control line regulator.
Figure 2:
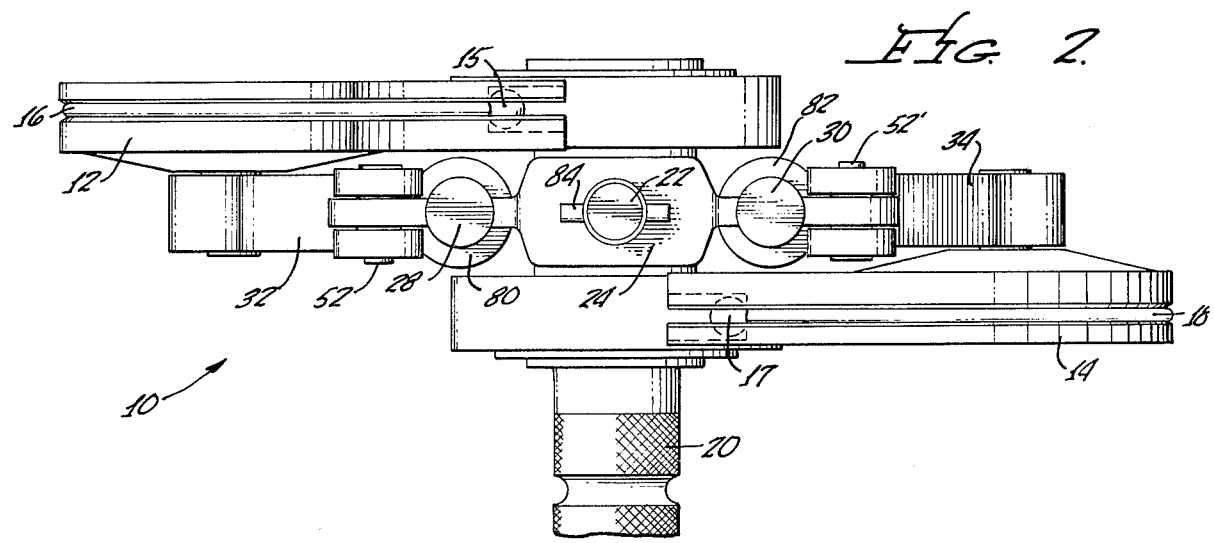
FIG. 2 is an end view of the control line regulator.

Referring to FIG. 1, a control line regulator 10 is shown with balanced sectors or plates 12 and 14 which are connected at 15 and 17 to respective sections of the control cables 16 and 18. The sectors 12 and 14 are centrally mounted on an operating shaft 20 which connects the control line regulator to the element to be controlled such as an aileron or rudder. Mounted on and extending generally perpendicular to the control shaft 20 is a lock or central shaft 22 on which a crosshead or control member 24 is slidably mounted. A connector plate 26 supports two guide rods 28 and 30 on opposite sides of the lock shaft 22. These guide rods 28 and 30 also slidably positioned by the crosshead 24. Connecting the respective sectors 12 and 14 to the crosshead are links 32 and 34. Mounted on each of the guide rods 28 and 30 are compression springs 36 which exert a predetermined force on the crosshead 24 to maintain tension on the control cables 16 and 18 equal to the desired rig load of the system.

Figure 3:
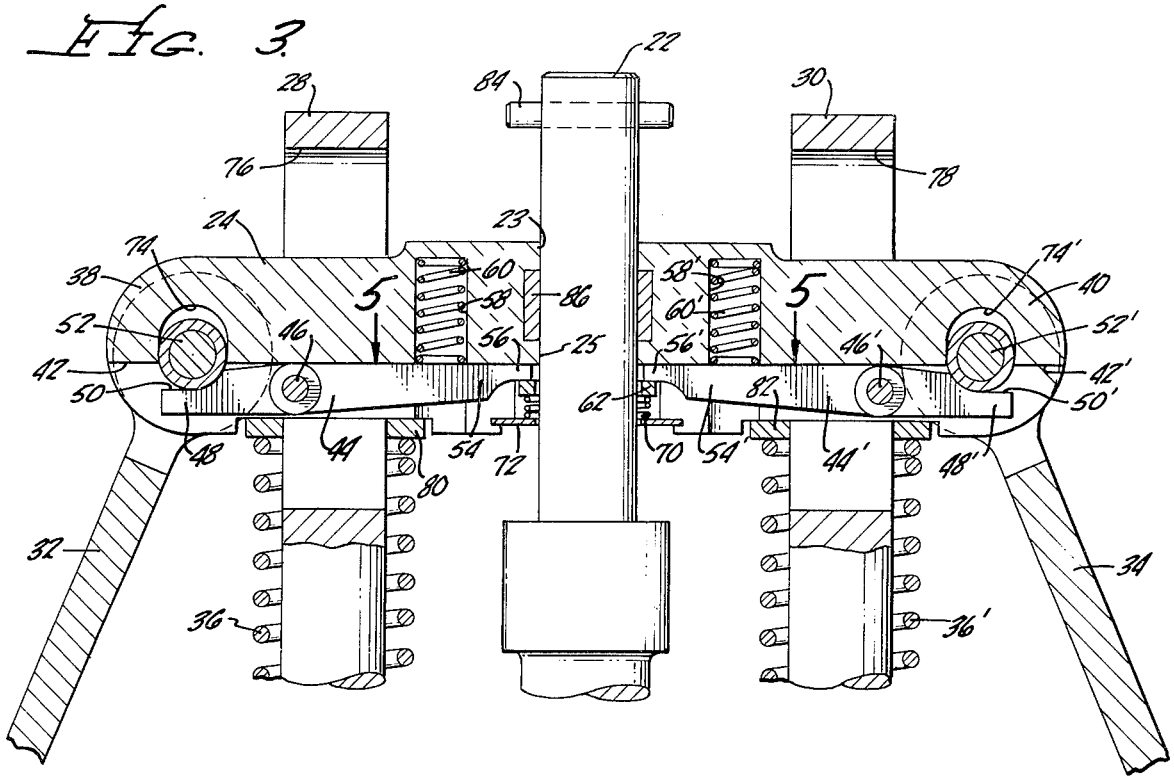
FIG. 3 is a partial sectional view of the control line regulator showing the detail of the surge lock.
Figure 4:
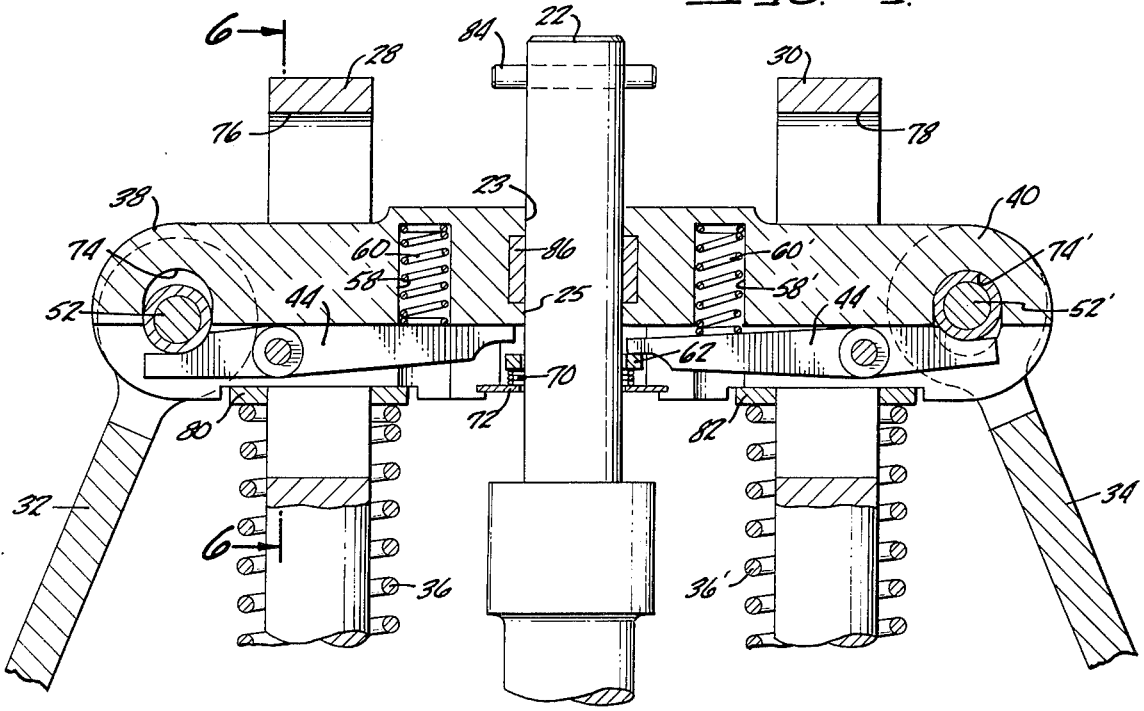
FIG. 4 is a partial sectional view of the control line regulator showing the surge lock in the activated position.

The crosshead 24, as shown in more detail in FIGS. 3 and 4, has a pair of circular lands 23 and 25 in slidable engagement with the lock shaft 22. Mounted around the locking shaft 22 and between the lands 23 and 25 on the crosshead 24 is a wiper gasket 86 used to keep the locking shaft 22 clean and smooth for easy movement of the crosshead along the shaft.

The following discussion of the surge lock is primarily directed to the left side 38 of the crosshead. However, the crosshead is mostly symmetrical and similar parts found on the right side 40 are indicated on the figures by the corresponding number primed.

Mounted in a slot 42 within the left side 38 of the crosshead 24 is an elongated lever or rocker arm 44. A pin 46 supported on the crosshead 24 and extending through the arm 44 allows the rocker arm to pivot within the slot 42 in crosshead 24. Located on the outer end 48 of the rocker arm 44 is a rounded recessed portion 50 in which a connecting pin 52 of the link 32 contacts. On the inner end 54 of the rocker arm 44 is a wedging flange 56. Located within the crosshead 24 is a cylindrical cavity 58 which contains an adjusting or actuating spring 60 located directly above the inner end 54 of the rocker arm 44.

Figure 5:
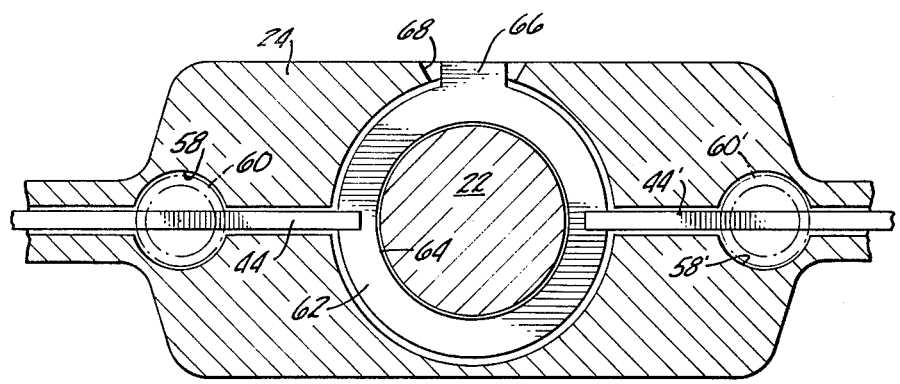
FIG. 5 is a cross-sectional view taken along lines 5—5 in FIG. 3.

Surrounding the locking shaft 22 is a locking member in the form of a canting or locking washer 62 which, as shown on FIG. 5, is loosely fitted around the locking shaft 22 to provide a small gap 64 between the locking shaft and the lock washer. The lock washer has a pivotal flange 66 which fits into a slot 68 on the crosshead 24.

Again referring to FIGS. 3 and 4, the lock washer 62 is biased against the wedge flanges 56 and 56' by a positioning spring 70 which surrounds the shaft 22 and is held or anchored by a spring seat 72 surrounding the shaft and held by the crosshead 24.

Figure 6:
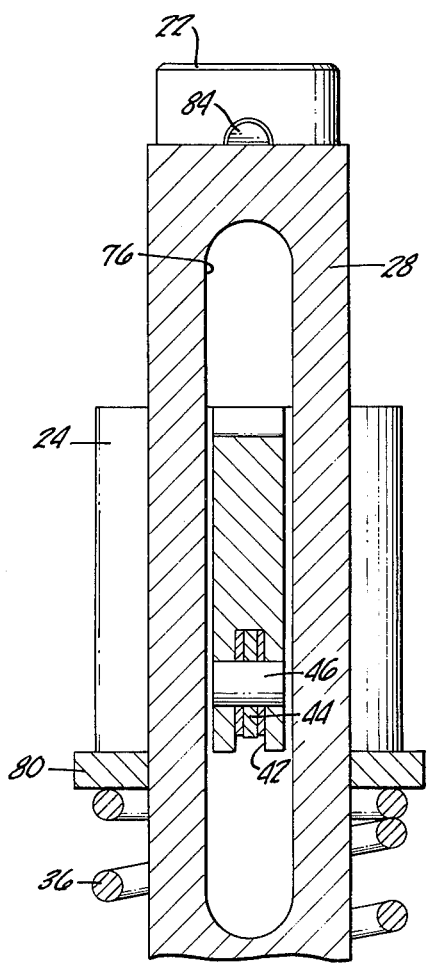
FIG. 6 is a cross-sectional view taken along lines 6—6 in FIG. 4.

An aperture 74 located in the outer ends of the crosshead 24 is slightly elongated in the vertical direction, as viewed in FIGS. 3 and 4, to provide an adjusting movement of the respective connecting pin 52. As seen from FIG. 6, the crosshead 24 extends through elongated slots 76 and 78 of the respective guide rods 28 and 30. Biasing washers 80 and 82 on the respective guide rods transmit a force against the crossarm 24 produced by the adjusting or compression springs 36.

A pin 84 in FIGS. 3 and 4 extending transversely through the upper end of the shaft 22 limits the throw of the crosshead 24.

Turning to the operation of the device, FIG. 1 shows the control line regulator in a balanced position with the control cables 16 and 18, properly tensioned by the compression springs 36, 36' exerting a desired tension on the crosshead 24 which in turn produces the balanced tension on the respective links 32 and 34 and on the sectors 12 and 14 to which the control cables 16 and 18 are connected. As shown more clearly in FIGS. 3 and 4, if the environment or temperature should cause the control cables 16 and 18 to change in length, the compression springs 36, 36' enable the crosshead to move within the slots 76 and 78 to accommodate slackening or tightening of the control cables.

If a control signal is applied to one of the control cables, the regulator will transmit the force to the controlled element. Such normal operation of a regulator is well known and need not be explained in detail here. If such details are desired, reference may be had to U.S. Pat. No. 3,316,775.

In the event a control cable should break, eliminating tension on it, the unbroken cable is left with an unbalanced tension, since the two cables were balanced with respect to each other through the regulator. In effect, the unbroken cable is like a spring when it is under tension and the breaking of the other cable releases the stored energy in the unbroken cable. The force produced causes the regulator shaft 20 to pivot in the direction of the unbroken cable to the point where the tension in the unbroken cable is balanced. If there are no forces on the cable caused by the element being controlled, the tension on the unbroken cable may tend to approach zero. The movement of the regulator shaft affects the control of the vehicle and is therefore undesirable. However, this somewhat limited movement of the regulator shaft can ususally be accommodated by other control adjustments of the vehicle.

If the regulator did not have a surge lock, a second condition that would immediately occur upon breaking of the cable is that the compression springs 36 and 36' would tend to drive the crosshead rapidly toward the stop pin 84. This would occur because the cables would no longer be restraining such movement. This action would place tension on the unbroken cable causing it to pivot the regulator shaft further in the direction of the unbroken cable. Since this would move the controlled element further from its original setting, such additional movement is highly undesirable and in some situations might be catastrophic in that it could place the vehicle so out of control that other compensating steps could not be taken.

With the surge lock of the present invention, breakage of a control cable would release the surge lock and prevent movement of the crosshead as urged by the compression springs. More specifically, if say control cable 18 should break, the force on link 34 would dissipate so that the connecting pin 52' would no longer be urged in the direction to engage the end 48' of the lock arm 44'. Instead the actuating spring 60' would pivot the lock arm 44' in the direction to urge the end 54 counterclockwise or downwardly, as seen in FIG. 4, and the connecting pin 52 would be forced upwardly into the elongated aperture 74'. This movement of the end 54' of the lock arm 44' would immediately pivot the lock washer 62 into wedging or locking engagement onto the locking shaft 22 as shown in FIG. 4. This prevents movement of the crosshead 24 toward the limit pin 84. Consequently, the energy stored in the compression springs 36 and 36' is not released and the control regulator shaft 20 is not pivoted further in the direction of the unbroken cable.

If the control cable 16 should break the same action as described above would occur except that the lock arm 44 would cause the lock washer 62 to wedge against the locking shaft. If both cables should break at the same time, both lock arms 44 and 44' would be released to hold the lock washer in its locking position.

The lock washer will remain locked or wedged against the locking shaft until the lock arms are once more pivoted upwardly against the actuator pins 60 and 60', allowing the positioning spring 70 to return the lock washer to its unlocked position. Such a pivoting force on the lock arms could, of course, be introduced by replacing the broken cables and once more applying tension to the links 32 and 34. As mentioned above, one of the features of the surge lock is that it can release automatically if a cable does not actually break but instead only has a sudden release of tension. For example, if a sudden structural flexing action of the vehicle should occur, sufficiently great to release tension on the cables, such as might occur during a rough landing of an aircraft, the actuating springs 60 and 60' would cause the surge lock to function. However, when tension is once more applied to the control cables, the surge lock 62 would be released.

What is claimed is:
1. A surge lock assembly comprising:
a lock shaft;
a crosshead slidably mounted on said lock shaft;

a pair of control cables connected under tension to said crosshead for operating a control element;

means for locking said crosshead on said lock shaft responsive to a surging release of said tension in one of said control cables and for maintaining said locked position of said crosshead when said tension in the other of said control cables is eliminated.

2. A surge lock assembly as defined in claim 1 and additionally comprising means within said crosshead for activating said locking and maintaining means.

3. A surge lock assembly as defined in claim 2 wherein said activating means comprises an actuating spring in biased contact with said locking and maintaining means.

4. A surge lock assembly as defined in claim 1 wherein said locking and maintaining means comprises a circular member loosely surrounding said lock shaft and pivotally mounted within said crosshead.

5. A surge lock assembly as defined in claim 1 wherein said locking and maintaining means comprises a rocker arm pivotally mounted on said crosshead.

6. A control line regulator surge lock assembly comprising:
a central shaft;
a control member slidably mounted on said central shaft;
a pair of control lines connected to the ends of said control member;
means for biasing said control member to maintain an equal tension in each of said control lines;
means within said control member responsive to unequal tensions in said control lines for gripping said control member on said shaft;
means circumferentially mounted on said central shaft for locking said control member on said central shaft; and
means pivotally mounted on said control member and responsive to a sudden surging release of tension in one of said control lines for activating said locking means to prevent said control member from moving in the forcing direction of said biasing means.

7. A control cable regulator comprising:
a control shaft;
a pair of balanced sectors pivotally mounted on said control shaft;
a pair of control cables, one of said control cables connected to one of said balanced sectors;
a lock shaft connected to said control shaft;
a crosshead slidably mounted on said lock shaft;
means connecting said balanced sectors to said crosshead;
a pair of guide members adjacent said lock shaft, said pair of guide members connected to said crosshead;
compression spring means biasing said crosshead on said lock shaft in a direction to maintain an equal tension on each of the control cables;
means within said crosshead responsive to unequal tensions placed on said pair of cables for binding said crosshead on said shaft to prevent said spring means from moving said crosshead in said direction;
a locking member surrounding a portion of said lock shaft; and
means for locking said locking member on said lock shaft in response to a surging release of tension on one of said control cables to prevent said crosshead from sliding on said lock shaft in order to retain the position of the other of said balanced sectors and the other of said control cables.

8. A control cable regulator comprising:
a control shaft;
a pair of balanced sectors pivotally mounted on said control shaft;
a pair of control cables, one of said control cables connected to one of said balanced sectors;
a lock shaft connected to said control shaft;
a crosshead slidably mounted on said lock shaft;
means connecting said balanced sectors to said crosshead;
a pair of guide members adjacent said lock shaft, said pair of guide members connected to said crosshead;
compression spring means biasing said crosshead on said lock shaft in a direction to maintain tension on the control cables;
a locking member surrounding a portion of said lock shaft;
a pair of rocker arms pivotally mounted on said crosshead, one end of each of said rocker arms being connected to said connecting means, the other end of each of said rocker arms being in position to move said locking member; and
a pair of activating springs mounted within said crosshead urging said pair of rocker arms to move the locking means into locking position, such that a surging release of tension in one of said cables causes one of said activating springs to pivot one of said rocker arms to move said locking member into locking engagement on said lock shaft.

9. A control cable regulator comprising:
a control shaft;
a pair of balanced sectors pivotally mounted on said control shaft;
a pair of control cables, one of said control cables connected to one of said balanced sectors;
a lock shaft connected to said control shaft;
a crosshead slidably mounted on said lock shaft;
means connecting said balanced sectors to said crosshead;
a pair of guide members adjacent said lock shaft, said pair of guide members connected to said crosshead;
compression spring means biasing said crosshead on said lock shaft in a direction to maintain tension on the control cables;
a locking member surrounding a portion of said lock shaft;
means for locking said locking member on said lock shaft responsive to a surging release of tension on one of said control cables; and
a positioning spring mounted on said lock shaft adjacent said locking member to urge said locking member into an unlocked position on said lock shaft.

10. An improved control cable regulator of the type wherein the control cables are maintained in a positive tension by compression spring means biased against a crosshead slidably mounted on a lock shaft and connected to a pair of balanced sectors attached to said control cables and wherein said crosshead will bind on said lock shaft when tension on said cables are unequal to prevent movement of said crosshead on said shaft to allow positive control of a controlled element connected to said cables, said improvement comprises:

additional locking means mounted on said crosshead adjacent said lock shaft to lock movement of said crosshead relative to said lock shaft; and means responsive to a surging release of tension in one of said control cables for activating said locking means and for maintaining a locked position of said locking means when each of said cables has essentially a zero tension.

11. An improved control regulator as defined in claim 10 wherein said locking means comprises a canting member.

12. A control line regulator surge lock assembly comprising:

a control shaft;

a pair of balanced sectors pivotally mounted on said control shaft;

a pair of control cables connected to said pair of balanced sectors;

a central shaft connected at right angles to said control shaft;

a control member slidably mounted on said central shaft;

means urging said control member in a direction for tensioning said control cables;

a canting ring supported onto said control member in a manner to be locked on said central shaft;

a first rocker arm pivotally mounted on said control member adjacent one side of said central shaft with one end positioned to move said canting ring;

a second rocker arm pivotally mounted adjacent the other side of said central shaft with one end positioned to move said canting ring;

a pair of activating springs mounted in said control member, each spring urging a respective one of said rocker arms in the direction to lock said canting ring on said central shaft; and link means connecting said sectors to the other ends of the rocker arms such that the tension on said cables urges the rocker arms against the urging of said activating springs so that said rocker arms are responsive to a surge release in tension in either of said control cables, which allows the activating spring for the affected rocker arm to pivot the rocker arm to move said canting ring and lock said control member on said central shaft.

13. A surge lock assembly as defined in claim 1 and additionally comprising means responsive to unequal tensions on said cables for binding said crosshead on said shaft and for releasing said crosshead when said tensions are equal in said cables.

14. A surge lock assembly as defined in claim 1 and additionally comprising means responsive to placement of tension in said cables for unlocking said locking means.

15. A control cable regulator comprising:

a pair of control cables connected to a control element;

means mounted along said control cables for exerting tension in said control cables;

means for locking said exerting means responsive to a surging release of said tension in one of said cables and for maintaining said locked position of said exerting means when said tension in the other of said control cables is substantially eliminated;

means responsive to placement of tension in said cables for unlocking said locking means.

* * * * *